July 23, 1968    R. M. GIACOBE    3,393,646
PALLET
Original Filed May 31, 1966
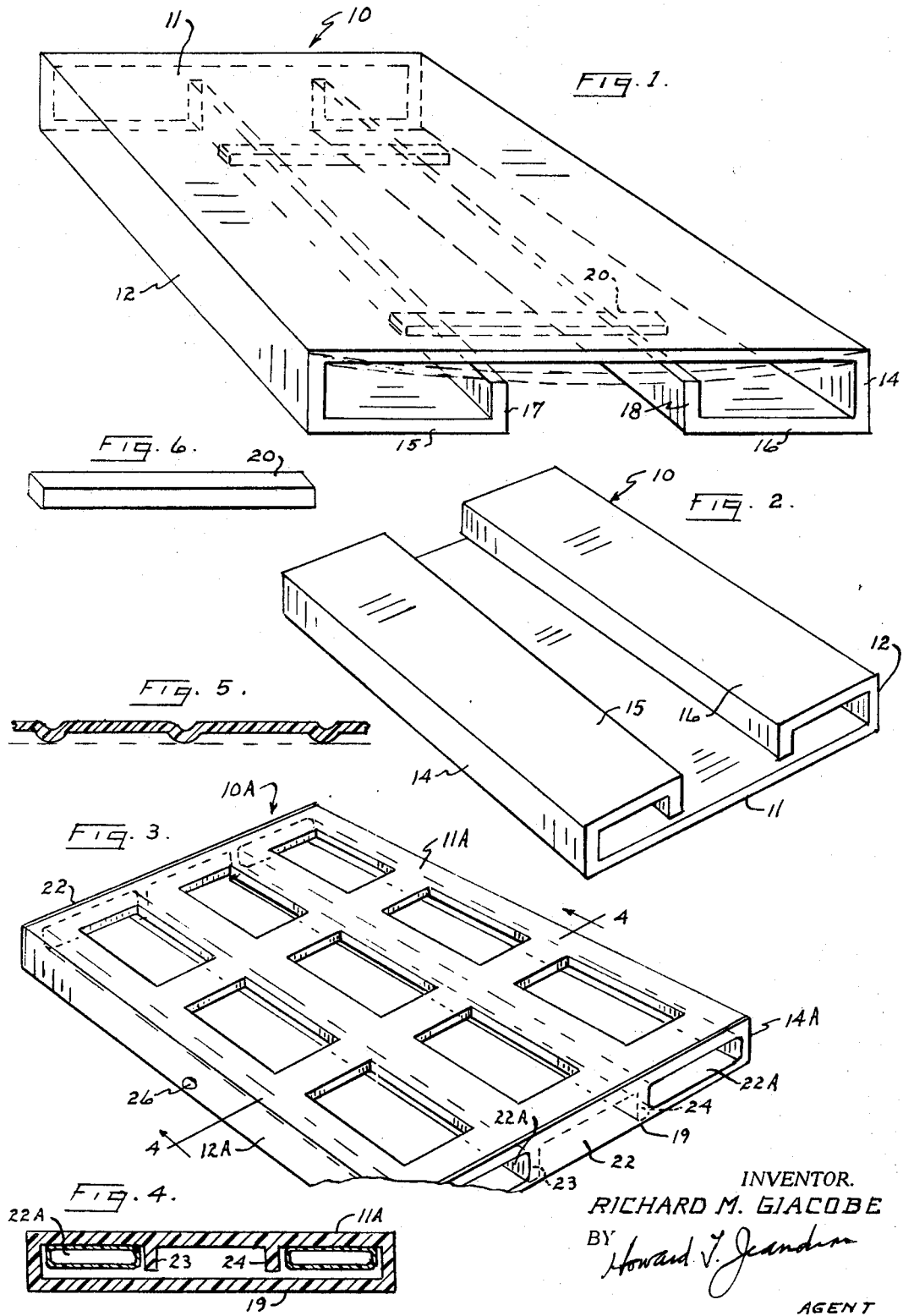
INVENTOR.
RICHARD M. GIACOBE
BY
AGENT

United States Patent Office 3,393,646
Patented July 23, 1968

3,393,646
PALLET
Richard M. Giacobe, 92 Ramsey Ave.,
Keansburg, N.J. 07734
Substituted for abandoned application Ser. No. 554,062, May 31, 1966. This application Feb. 8, 1967, Ser. No. 614,701
3 Claims. (Cl. 108—52)

ABSTRACT OF THE DISCLOSURE

A pallet for supporting stacked sheets or articles for storage and also for transfer by fork lift truck from place to place in which said pallet is formed from a single sheet of a light weight material and in which the sheet is formed with an upper platform, a pair of sides, inwardly turned legs on either side with the ends of the legs turned upward to form upright spaced supports adjacent the central portion of said pallet and in which the central supports are slightly shorter than the sides so that the platform retaining stacked sheets of material will be pressed into a concave form which tends to hold the stacked sheets and prevent slipping of the sheets to either side.

This is a substitute application for my previously filed application Ser. No. 554,062, filed May 31, 1966, Richard M. Giacobe, inventor, title Pallet, application now abandoned.

This invention relates to pallets and in particular molded pallets.

Hitherto most of the pallets have been used for holding stacked sheets and articles, not only during storage but also for transfer by fork lift truck from place to place within a plant, also for shipment in flat cars, semi-trailers, and the like. These pallets are used in large quantities. The returning of the empty pallets requires storage. This has been a serious problem. One of the requirements for pallets is to be approximately 4″ in height in order to accommodate the 4″ rollers on the ends of the forks of the fork lift trucks used in handling the loaded pallets. Pallets have been molded from plastic impregnated paper or fabric in various shapes but have not been properly designed for heavy loading. With the improvement of the plastic materials such as the polystyrene products and the resinous materials to stronger and heavier forms these materials, especially those turned out in sheet form that may be pressed under heat and reformed into desired shapes, lend themselves to the manufacture of this type of pallet. Due to the enormous cost of producing pallets by the injection molding process it is preferable to utilize the plastic products already available in sheet form and in a desired thickness and weight that is moldable under heat as already described. It is also to be understood that fillers, pigments, lubricants, antioxidants, fiberglass, and any required ingredient may be included. The heavier and tougher plastics may be used for strength and long life, however, the extremely light polystyrenes and foam material may be used for special uses where weight is a factor and a reasonable degree of strength and durability is sufficient. In view of the changing conditions of the prior art, that is, the specific requirements for clearance for pick up by the fork lift truck, the desirability of lighter weight pallets and the desirability of utilizing a new formation of the top platform to assist in stacking and the improved materials and process available for the manufacture of these pallets are sufficient reason for the improvements defined in this invention and it is an object of this invention to incorporate some of these changes in a new pallet.

The plastic sheet may be flat in form, or may be corrugated or ribbed as desired to provide extra strength.

It is an object of my invention to provide a new and improved pallet which is impervious to moisture and will endure and stand up under any weather conditions.

Another object is to provide a new and improved molded pallet of the character indicated, which is extremely strong.

Another object is to provide a new and improved molded pallet of the character indicated, which retains any liquid drainage within said pallet.

Yet another object is to provide a new and improved pallet that will assume a concave form in its supporting platform under load to assist in retaining stacked flat stock.

Other objects of this invention may be apparent by reference to the accompanying detailed description and the drawings:

FIGURE 1 is a perspective view of a pallet;
FIGURE 2 is a perspective view of the pallet in a reverse position;
FIGURE 3 is a perspective view of a further embodiment of the pallet;
FIGURE 4 is a cross sectional view taken on line 4—4 of FIG. 3;
FIGURE 5 is a cross sectional view of the said pallet shown in a corrugated or ribbed form, and
FIGURE 6 is a perspective view of block elements used in conjunction with FIG. 1.

Referring to the drawings and particularly FIG. 1, there is illustrated pallet 10. The pallet 10 is formed from a single sheet of plastic material which may be any of the above mentioned thermosetting plastics, that is, a plastic sheet that may be reformed under heat or pressure as illustrated in FIG. 1. The pallet 10 is in fact a sheet of plastic material having an upper platform 11, a pair of sides 12 and 14 and inwardly turned legs 15 and 16 with the ends of the legs 15 and 16 turned upward to form upright supports 17 and 18. It is to be noted that the supports 17 and 18 do not extend to the under-surface of platform 11. The spacing between the upper edge of supports 17 and 18 and the under surface of platform 11 may be extremely small such as $\frac{1}{16}''$. Thus the pallet 10 as illustrated in FIG. 1 is provided in a standard size such as 3′ wide by 3½′ long, however, the second form is also utilized wherein the pallet is 3′ wide by 7′ long. It is to be noted that both ends of these pallets are open and the height of the platform for a standard pallet is 4″, however, with some of the plastic pallets a 3″ height is sufficient with the ends open as illustrated the pallet is easily picked up by a fork lift truck to be moved from place to place. It is noted that although the platform is perfectly flat in its normal unloaded form when this type of pallet is to be used for supporting stacked sheet material the weight of the material will cause the platform 11 to be pressed into a concave form as illustrated in dotted lines, thus the concave form tends to hold the stacked sheets and prevent the slipping of the sheets to either side so often found with flat topped pallets. In the event the pallet is to be used for carrying other type articles where the concave form is not desired, there is provided a plurality of filler supports 20 as illustrated in FIG. 6 two or more of these supports may be inserted under platform 11 resting on the top of the uprights 17 and 18 thus retaining platform 11 perfectly flat when so needed.

Referring to FIG. 2, pallet 10 is similar to the pallet 10 described in FIG. 1. However, in this embodiment the pallet is turned over lying in a reversed position thus the platform 11 becomes the supporting base while the legs 15 and 16 provide a pair of parallel platforms for supporting articles thereon. In this instance bar stock or elongated flat pieces of stock may be laid side by side as illustrated and in this position deposited adjacent the device such as a lathe in a machine shop where the articles are to be worked upon. With stock on this reversible pallet it is easy to either manually insert the hands under the stock through the center open area of the pallet for lifting the stock or with heavier material it is easy to insert a chain or lifting cable around the stock through this open area to permit lifting the stock to its desired position upon the machine or wherever needed, thus pallet 10 has many uses, and, of course, in either its upright position of FIG. 1 or its reverse position of FIG. 2 it is easily picked up by a fork lift truck through the open areas within the legs 15 and 16. It is also to be understood that the flat sheet plastic illustrated in FIGS. 1 and 2 may be replaced with corrugated or ribbed plastic sheets as shown in FIG. 5. This provides a stronger platform or stronger base as the case may be.

Referring to FIG. 3, there is illustrated a further embodiment of the pallet. In this instance the pallet 10A may be formed from a plastic sheet or may be an extruded plastic product. In either instance, as with the plastic sheet it is formed with an upper platform 11A with sides 12A and 14A and with a base 19 sealed to both sides thus forming a box like structure. In addition the open ends shown after the formation of this box like structure, are to be covered with a plastic rectangular sheet 22 and sealed to the plastic sheet forming the top, sides and bottom as described. The ends 22 must be provided with pockets 22A that extend into or through the box-like structure, this is to permit the pickup prongs of the fork lift trucks to extend into and under the platform, thus allowing the pallets to be picked up. In addition there are provided a pair of uprights or supporting webs 23 and 24 sealed to or formed as a part of the plastic sheet to provide stiffening the length of the pallet, spaced in relation as shown. These supports 23 and 24 may be sealed as a part of either the upper platform 11A or the lower base 19 but not attached to both and the supports 23 and 24 may be slightly shorter than the sides 12A and 14A, thus permitting the platform 11A to be depressed when loading, this forms a concave shape as in FIG. 1 to assist in holding stacked articles, such as sheets to prevent them from shifting. It is to be further noted that platform 11A may be perforated in various patterns such as the pattern illustrated which is a plurality of rectangular perforations, reducing the weight of the pallet while retaining the desired strength of the pallet. With this type of enclosed tank-like pallet with a perforated top, various materials that are loaded with moisture or that are still draining may be stacked on this pallet and the drainage from the material on the pallet will go into the tank-like structure of the pallet. A drain plug 26 may be provided in the lower portion of the pallet so that when the pallet is used in this way after use it may be easily drained. It is to be noted that blocks such as the blocks 20 illustrated in FIG. 6 or shorter than those illustrated may be utilized to be positioned over the uprights 23, 24 or under the uprights 23, 24, as the case may be to supply support to retain platform 11A in a level position under load where desired. A further embodiment of this invention would be similar to FIG. 3 except that the platform 11A would not be perforated, thus the box-like structure would be sealed air tight. This pallet would be light and if used around the water it would be buoyant and could not be lost overboard. The air within also provides a cushioning effect for the articles carried on this type of pallet. Although plastic sheet pallets are preferable, providing a material that is not affected by moisture or by acids and is durable under most any condition. Other reasons for using plastic material that is now tough enough and strong enough for this type of use, is the ability to pigment the material to any desired color even to a perfectly clear transparent pallet. However, with the pallet as designed they may also be constructed of metal where a particular use requires metal such as handling of red hot articles from the furnace or in other metal working operations. Without departing from the spirit of this invention, this invention shall be limited only by the appended claims.

What is claimed is:

1. A molded pallet, comprising a sheet of generally flat sheet material that is formed into a top platform, a pair of integral parallel side walls, a pair of integral inwardly turned and spaced bottoms to provide a pair of supporting bases and a pair of integral upwardly turned supports that are parallel and in spaced relation, said platform and said bases being spaced apart sufficiently to permit entry of the forks of a fork lift truck there between, said upwardly turned supports being slightly shorter than said parallel side walls to permit said top platform to deform from a normally flat posture to a concave shape under load.

2. In a pallet according to claim 1 in which said top platform deforms under load to a concave shape and filler supports for levelling any portion of said platform.

3. In a pallet according to claim 1 in which said pallet is reversed and said top platform becomes the supporting base and said spaced bottoms become spaced platforms.

References Cited

UNITED STATES PATENTS

| | | | |
|---|---|---|---|
| 2,444,183 | 6/1948 | Cahners | 108—56 |
| 3,000,603 | 9/1961 | Hemann | 108—56 |
| 3,026,078 | 3/1962 | Simkins | 108—56 |
| 3,079,876 | 3/1963 | Doane | 108—56 |
| 3,192,099 | 6/1965 | Beckman et al. | 108—52 XR |
| 3,251,321 | 5/1966 | Budd | 108—54 |
| 3,267,882 | 8/1966 | Rapson et al. | 108—51 |
| 3,302,593 | 2/1967 | Roberts | 108—56 |

FOREIGN PATENTS 836,401  4/1952  Germany.

BOBBY R. GAY, *Primary Examiner.*

G. O. FINCH, *Assistant Examiner.*